United States Patent Office 3,431,796
Patented Mar. 11, 1969

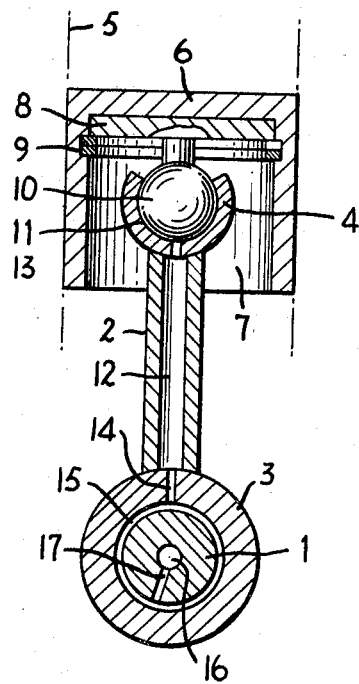

3,431,796
OPERATIVE CONNECTION BETWEEN A PISTON AND A PISTON ROD
Knud V. Valbjorn, Nordborg, Denmark, assignor to Danfoss A/S, Nordborg, Denmark, a company of Denmark
Filed Oct. 21, 1966, Ser. No. 588,448
Claims priority, application Germany, Oct. 23, 1965, D 48,498
U.S. Cl. 74—587                                            2 Claims
Int. Cl. F16h 21/24

ABSTRACT OF THE DISCLOSURE

An operative connection between a piston and piston rod in which an insert internally of the piston skirt adjacent the underside of the piston crown mounts a ball received in a socket fixed to the piston rod. The insert is a plate releasably held in the piston by a snap ring.

---

This invention relates generally to piston and piston rod connections and more particularly to a piston and piston rod operative connection for small refrigeration compressors.

It is known to make operative connections between a piston rod and a piston by provision of a tempered-steel ball at the connection end of the piston. In these known connections or joints the piston is provided with a socket that receives the ball so that a universal joint is formed. The connection not only allows conventional pivoting movement between a piston rod and piston but also allows small alignment inaccuracies between the cylinder and the crank pin to be compensated.

The known constructions of connections or joints of a ball-and-socket type, between pistons and piston rods, can only be lubricated from an open end of the socket. In many cases this method of lubrication is insufficient. The bearing or cooperating surfaces of the ball and socket do not obtain sufficient lubrication in these known joints. This disadvantage is aggravated by the fact that the entire drive force transmitted between a piston and a piston rod is transmitted across the bearing surfaces between the ball and the socket. The forces encountered in operation generate frictional forces which are unduly large if lubrication is inadequate since the components of the joint move relative to one another during operation.

It is a principal object of the present invention to provide a new and improved ball-and-socket universal joint for connecting a piston and its piston rod Another object of the present invention is to provide a ball-and-socket joint structure, for use in connecting a piston and its piston rod, which is adequately lubricated under all operational conditions.

A feature of the joint according to the invention is the provision of a socket on a piston rod and a ball on a piston. The ball is preferably mounted on a separate insert readily removably mounted within the piston.

Provision is made for proper lubrication, in the ball-and-socket joint of the invention, by providing lubrication passageways through the piston rod and socket capable of adequately lubricating the cooperating surfaces of the socket and ball. Lubrication can be provided during the suction stroke of a compressor, for example, a refrigeration compressor, or may be provided under pressure through the passageways.

While heretofore in ball-and-socket joints for pistons and piston rods the socket was generally integrally cast with the piston the present invention provides for the ball to be prefabricated. The ball is generally made of tempered steel and mounted on the piston after independent manufacture thereof.

Other features and advantages of the ball-and-socket connection in accordance with the present invention will be better understood as described in the following specification and appended claims, in conjunction with the drawing illustrating a section view of a piston and piston rod provided with a ball-and-socket joint or connection in accordance with the invention.

As illustrated in the drawing a crank pin 1 of a crankshaft drive, for example the crankshaft of a refrigerant compressor, is connected to a piston rod having a crank bearing 3 connecting the piston rod with the crank pin. The piston rod is provided at an opposite end with a socket 4 fixed thereto connecting the piston rod to a piston 6 as hereinafter described. The piston 6 is reciprocably driven in a cylinder 5, illustrated diagrammatically by broken lines, for example a cylinder of a small refrigerant compressor.

The skirt of the piston 6 has an inner space or cavity 7 closed at one end in known manner by the piston crown. An insert or plate 8 is disposed within the skirt abutting the inner surfaces of the crown of the piston and is held fixed within the piston by a lock means comprising a snap ring 9 received in an inner annular groove axially spaced from the crown as illustrated in the drawing. The insert 8 has fixed thereto and depending therefrom a tempered-steel ball 10 which, along with the insert and snap ring, is manufactured independently of the piston and heat treated as required.

The ball 10 is received within the socket 4 which encloses the ball circumferentially sufficiently to form a positive joint between the ball and socket. The socket has a cross section enclosing more than a hemispherical portion of the ball. The socket can be mounted or formed on the ball separate from the piston and then the piston rod assembly fixed to the piston by insertion of the insert 8 and secured by the snap ring. The cooperating surfaces of the ball and socket allow "universal" movement and preferably constitute bearing surfaces in known manner.

Provision is made for lubricating the bearing surfaces of the ball and socket by provision of a passageway 12 extending longitudinally of the piston rod 2 and in communication with a passageway 13 extending transversely of the socket 4. An oil bore or passageway 14 provides communication between the passageway 12 and an annular groove 15 formed on the crank pin 1. This groove communicates with the forced lubrication system of the apparatus, not shown, for example a refrigeration compressor, through a bore 16 extending through the crank pin which communicates with the groove through a cross-bore or cross-passageway 17.

Those skilled in the art will understand that the socket 4 and the crank bearing 3 may be manufactured integrally, if desired, with the piston rod as an assembly and the various passageways drilled therein one operation. Moreover the mounting plate or insert 8 may be otherwise secured to the inner surface of the crown of the piston 6 rather than being mounted removably by a snap ring. The ball 10 may be welded on the inner or lower surface of the crown by a connecting piece. The forces generated will permit such construction since during compression strokes greater forces are encountered than during a suction stroke. Thus that ball need not be made or cast integrally with the piston as is the case when a socket is fixed to the piston and the ball to the rod. Thus the entire assembly can be easily made of components separately fabricated and suitably heat treated.

The invention provides for sufficient lubrication to to take place during a suction stroke of the piston by entry of lubricant between the ball and socket by the clearances between their bearing surfaces. It will be remembered that in small refrigerant compressors, such as hermetically sealed refrigeration compresors, the lubricating oil is in the base of the apparatus and is drawn up or splashed to carry out lubrication. However, application of lubricant under pressure is preferred as above described.

While a preferred embodiment of the invention has been shown and described it will be understood that many modifications and changes can be made within the true spirit and scope of the invention.

I claim:
1. For use in combination, a piston having a crown and a skirt having a groove internally of said skirt, a plate insertable internally of said skirt and having a ball secured thereto, a snap ring received in said groove in use removably locking said plate against an underside of said crown and internally of said skirt, and a piston rod having a socket fixed thereto on an end thereof and dimensioned for receiving therein said ball securing said socket to said ball, whereby a universal ball-and-socket joint is defined between said piston and said piston rod.

2. In combination, a piston, a piston rod, a ball-and-socket joint joining said piston and said piston rod comprising a socket on an end of said piston rod, a ball connected to said piston mounted internally of said piston and received in said socket defining a universal connection, said piston having a skirt including means mounting said ball internally of a space defined by said piston skirt, said means mounting said ball comprising an insert comprising a plate disposed on an underside surface of the crown of said piston, lock means removably locking said plate to inner surfaces of said skirt, means fixing said ball to said plate in position for being received by said socket, and said lock means comprising a snap ring.

References Cited
UNITED STATES PATENTS

| 1,434,904 | 11/1922 | Mansfield | 74—579 |
| 1,637,765 | 8/1927 | Comstock | 74—587 |

FRED C. MATTERN, Jr., *Primary Examiner.*

W. S. RATLIFF, Jr., *Assistant Examiner.*

U.S. Cl. X.R.

74—579